(12) United States Patent
Toda

(10) Patent No.: US 8,416,294 B2
(45) Date of Patent: Apr. 9, 2013

(54) POSITIONING DEVICE, POSITIONING METHOD, STORAGE MEDIUM AND IMAGE CAPTURING DEVICE

(75) Inventor: Naoto Toda, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 173 days.

(21) Appl. No.: 12/960,739

(22) Filed: Dec. 6, 2010

(65) Prior Publication Data
US 2011/0141275 A1 Jun. 16, 2011

(30) Foreign Application Priority Data

Dec. 15, 2009 (JP) ................................. 2009-283711

(51) Int. Cl.
*H04N 7/18* (2006.01)
(52) U.S. Cl. .......................... 348/113; 348/115; 348/116
(58) Field of Classification Search ........... 348/113–117
See application file for complete search history.

(56) References Cited

U.S. PATENT DOCUMENTS

| | | | |
|---|---|---|---|
| 5,381,338 A * | 1/1995 | Wysocki et al. | ............. 701/409 |
| 2003/0236619 A1 | 12/2003 | Dorian et al. | |
| 2007/0010940 A1 | 1/2007 | Tan et al. | |
| 2010/0225756 A1* | 9/2010 | Miyata | .......................... 348/116 |

FOREIGN PATENT DOCUMENTS

| | | |
|---|---|---|
| CN | 101033975 A | 9/2007 |
| CN | 101064061 A | 10/2007 |
| JP | 2008-232771 | 10/2008 |
| JP | 2009-063336 A | 3/2009 |

OTHER PUBLICATIONS

Chinese Office Action dated Jul. 25, 2012 (and English translation thereof) in counterpart Chinese Application No. 201010589807.5.
Korean Office Action dated Feb. 23, 2012 (and English translation thereof) in counterpart Korean Application No. 10-2010-0127736.
Chinese Office Action dated Nov. 26, 2012 (and English translation thereof) in counterpart Chinese Application No. 201010589807.5.

* cited by examiner

*Primary Examiner* — Andy Rao
(74) *Attorney, Agent, or Firm* — Holtz, Holtz, Goodman & Chick, P.C.

(57) ABSTRACT

A positioning device comprising: a movement measurement unit that measures relative position variation; a positioning unit that enables measurement of positional information; and a control unit that starts continuous measurement of position variation by the movement measurement unit and measurement of positional information by the positioning unit at each predetermined timing for at least a specified position, and determines a position determination spot based on positional information of any of the at least two positions in a case that the difference between the amount of position variation and the amount of relative position variation is determined by the determining unit to be within a predetermined range, and calculates positional information of the specified position based on positional information of the position determination spot and information of position variation that has been continuously measured by the movement measurement unit.

10 Claims, 6 Drawing Sheets

FIG. 3A
MOVEMENT HISTORY DATA (AUTONOMOUS NAVIGATION POSITIONING)

| No. | TIME | POSITIONAL DATA | MOVEMENT VECTOR | |
|---|---|---|---|---|
| 1 | t0 | X:0.0, Y:0.0 | — | (PHOTOGRAPHING POSITION) |
| 2 | t1 | X:0.0, Y:−0.2 | X:0.0, Y:−0.2 | |
| 3 | t2 | X:0.0, Y:−0.4 | X:0.0, Y:−0.2 | |
| ⋮ | ⋮ | ⋮ | ⋮ | |
| 10 | t9 | X:−1.0, Y:−1.3 | X:0.0, Y:−0.2 | |
| 11 | t10 | X:−1.2, Y:−1.3 | X:−0.2, Y:0.0 | |
| 12 | t11 | X:−1.4, Y:−1.3 | X:−0.2, Y:0.0 | |
| 13 | t12 | X:−1.7, Y:−1.3 | X:−0.3, Y:0.0 | |
| 14 | t13 | X:−1.7, Y:−1.5 | X:0.0, Y:−0.2 | |
| 15 | t14 | X:−1.7, Y:−1.8 | X:0.0, Y:−0.3 | |

FIG. 3B
MOVEMENT HISTORY DATA (GPS POSITIONING)

| No. | TIME | POSITIONAL DATA | MOVEMENT VECTOR | |
|---|---|---|---|---|
| 1 | t0 | X:279.6, Y:181.9 | — | (POSITIONAL DATA AT THE TIME OF PHOTOGRAPHING) |
| 2 | t1 | X:280.0, Y:181.7 | X:0.4, Y:−0.2 | |
| 3 | t2 | X:280.4, Y:181.5 | X:0.4, Y:−0.2 | |
| ⋮ | ⋮ | ⋮ | ⋮ | |
| 10 | t9 | X:280.7, Y:180.5 | X:0.2, Y:−0.2 | |
| 11 | t10 | X:280.5, Y:180.5 | X:−0.2, Y:0.0 | |
| 12 | t11 | X:280.3, Y:180.5 | X:−0.2, Y:0.0 | |
| 13 | t12 | X:280.0, Y:180.5 | X:−0.3, Y:0.0 | |
| 14 | t13 | X:280.0, Y:180.3 | X:0.0, Y:−0.2 | |
| 15 | t14 | X:280.0, Y:180.0 | X:0.0, Y:−0.3 | (POSITION DETERMINATION SPOT) |

FIG. 3C
MOVEMENT HISTORY DATA AFTER ABSOLUTE POSITION IS REFLECTED

| No. | TIME | POSITIONAL DATA | MOVEMENT VECTOR | |
|---|---|---|---|---|
| 1 | t0 | X:281.7, Y:181.8 | — | (PHOTOGRAPHING POSITION) |
| 2 | t1 | X:281.7, Y:181.6 | X:0.0, Y:−0.2 | |
| 3 | t2 | X:281.7, Y:181.4 | X:0.0, Y:−0.2 | |
| ⋮ | ⋮ | ⋮ | ⋮ | |
| 10 | t9 | X:280.7, Y:180.5 | X:0.0, Y:−0.2 | |
| 11 | t10 | X:280.5, Y:180.5 | X:−0.2, Y:0.0 | |
| 12 | t11 | X:280.3, Y:180.5 | X:−0.2, Y:0.0 | |
| 13 | t12 | X:280.0, Y:180.5 | X:−0.3, Y:0.0 | |
| 14 | t13 | X:280.0, Y:180.3 | X:0.0, Y:−0.2 | |
| 15 | t14 | X:280.0, Y:180.0 | X:0.0, Y:−0.3 | |

POSITIONING DEVICE, POSITIONING METHOD, STORAGE MEDIUM AND IMAGE CAPTURING DEVICE

This application is based on and claims the benefit of priority from Japanese Patent Application No. 2009-283711, filed on 15 Dec. 2009, the content of which is incorporated herein by reference.

BACKGROUND OF THE INVENTION

1. Field of the Invention

The present invention relates to a positioning device, positioning method, storage medium and image capturing device.

2. Related Art

Conventionally, there has been a positioning device that determines a position of a reference spot using a positioning unit such as a Global Positioning System (GPS) that can measure an absolute position.

For example, Japanese Unexamined Patent Application Publication No. 2008-232771 proposes a positioning device that corrects measurement error of a sensor for autonomous navigation that calculates positional information using an acceleration sensor, a direction sensor, and the like, based on the results of GPS positioning.

However, the positioning device disclosed in Japanese Unexamined Patent Application Publication No. 2008-232771 cannot acquire output information from the appropriate GPS satellites immediately after activation of the positioning unit, and accordingly, often cannot obtain accurate positional information. In addition, accurate positional information may not be able to be obtained based on the results of the GPS positioning also due to the environment of the positioning device (e.g., occurrence of multipath in an urbane area and conditions of the ionosphere). As a result, it is difficult for the positioning device disclosed in Japanese Unexamined Patent Application Publication No. 2008-232771 to determine an accurate position, for example, while being in an unstable state of positioning such as immediately after activation, and even if measurement of a stable absolute position is made possible thereafter, an accurate position during the previous unstable state of positioning cannot be obtained.

It is an object of the present invention to provide a positioning device, positioning method, storage medium and image capturing device, which can improve the accuracy of positional information in an unstable state of positioning by way of a positioning unit.

SUMMARY OF THE INVENTION

In order to attain the above object, in accordance with another aspect of the present invention, there is provided a positioning device including: a movement measurement unit that measures relative position variation; a positioning unit that enables measurement of positional information; a control unit that issues a command to cause the movement measurement unit to carry out continuous measurement of position variation and cause the positioning unit to carry out measurement of positional information at each predetermined timing for at least a specified position; a determining unit that determines whether a difference between an amount of position variation calculated based on positional information of at least two positions obtained by the positioning unit and an amount of relative position variation of at least two spots each obtained by the movement measurement unit concurrently with the positional information obtained by the positioning unit is within a predetermined range; and a specified position calculating unit that determines a position determination spot based on positional information of any of the at least two positions in a case that the difference between the amount of position variation and the amount of relative position variation is determined by the determining unit to be within a predetermined range, and calculates positional information of the specified position based on positional information of the position determination spot and information of position variation that has been continuously measured by the movement measurement unit.

In order to attain the above object, in accordance with another aspect of the present invention, there is provided a positioning method for obtaining positional information of a specified position, using a movement measurement unit that measures relative position variation and a positioning unit that enables measurement of positional information; the method including: a control step of issuing a command to cause the movement measurement unit to carry out continuous measurement of position variation and cause the positioning unit to carry out measurement of positional information at each predetermined timing for at least a specified position; a determining step of determining whether a difference between an amount of position variation calculated based on positional information of at least two positions obtained by the positioning unit and an amount of relative position variation of at least two spots each obtained by the movement measurement unit concurrently with the positional information obtained by the positioning unit is within a predetermined range; and a specified position calculating step of determining a position determination spot based on positional information of any of the at least two positions in a case that the difference between the amount of position variation and the amount of relative position variation is determined in the determining step to be within a predetermined range, and calculating positional information of the specified position based on positional information of the position determination spot and information of position variation that has been continuously measured by the movement measurement unit.

In order to attain the above object, in accordance with another aspect of the present invention, there is provided a storage medium having stored therein a program executable by a computer for obtaining positional information of a specified position by respectively inputting measurement results from a movement measurement unit that measures relative position variation and a positioning unit that enables measurement of positional information, to implement: a control function of issuing a command to cause the movement measurement unit to carry out continuous measurement of position variation and cause the positioning unit to carry out measurement of positional information at each predetermined timing for at least a specified position; a determining function of determining whether a difference between an amount of position variation calculated based on positional information of at least two positions obtained by the positioning unit and an amount of relative position variation of at least two spots each obtained by the movement measurement unit concurrently with the positional information obtained by the positioning unit is within a predetermined range; and a specified position calculating function of determining a position determination spot based on positional information of any of the at least two positions in a case that the difference between the amount of position variation and the amount of relative position variation is determined by the determining function to be within a predetermined range, and calculating positional information of the specified position based on positional information of the position determination spot and information of position variation that has been continuously measured by the movement measurement unit.

In order to attain the above object, in accordance with a first aspect of the present invention, there is provided an image capturing device, including: an image capturing unit that photographs a subject and acquires captured image information; a movement measurement unit that measures relative position variation; a positioning unit that enables measurement of positional information; a control unit that issues a command to cause the movement measurement unit to carry out continuous measurement of position variation and cause the positioning unit to carry out measurement of positional information at each predetermined timing for at least a photographing position by the image capturing unit; a determining unit that determines whether a difference between an amount of position variation calculated based on positional information of at least two positions obtained by the positioning unit and an amount of relative position variation of at least two spots each obtained by the movement measurement unit concurrently with the positional information obtained by the positioning unit is within a predetermined range; and a specified position calculating unit that determines a position determination spot based on positional information of any of the at least two positions in a case that the difference between the amount of position variation and the amount of relative position variation is determined by the determining unit to be within a predetermined range, and calculates positional information of the photographing position based on positional information of the position determination spot and information of position variation that has been continuously measured by the movement measurement unit.

According to the present invention, it is possible to achieve an improvement in the accuracy of positional information in an unstable state of positioning by way of a positioning unit.

BRIEF DESCRIPTION OF THE DRAWINGS

FIG. 3 shows data charts illustrating examples of movement history data;

DETAILED DESCRIPTION OF THE INVENTION

Hereinafter, an embodiment of the present invention will be explained with reference to the drawings. It should be noted that the scope of the invention is not limited to the illustrated examples.

Figure 1:
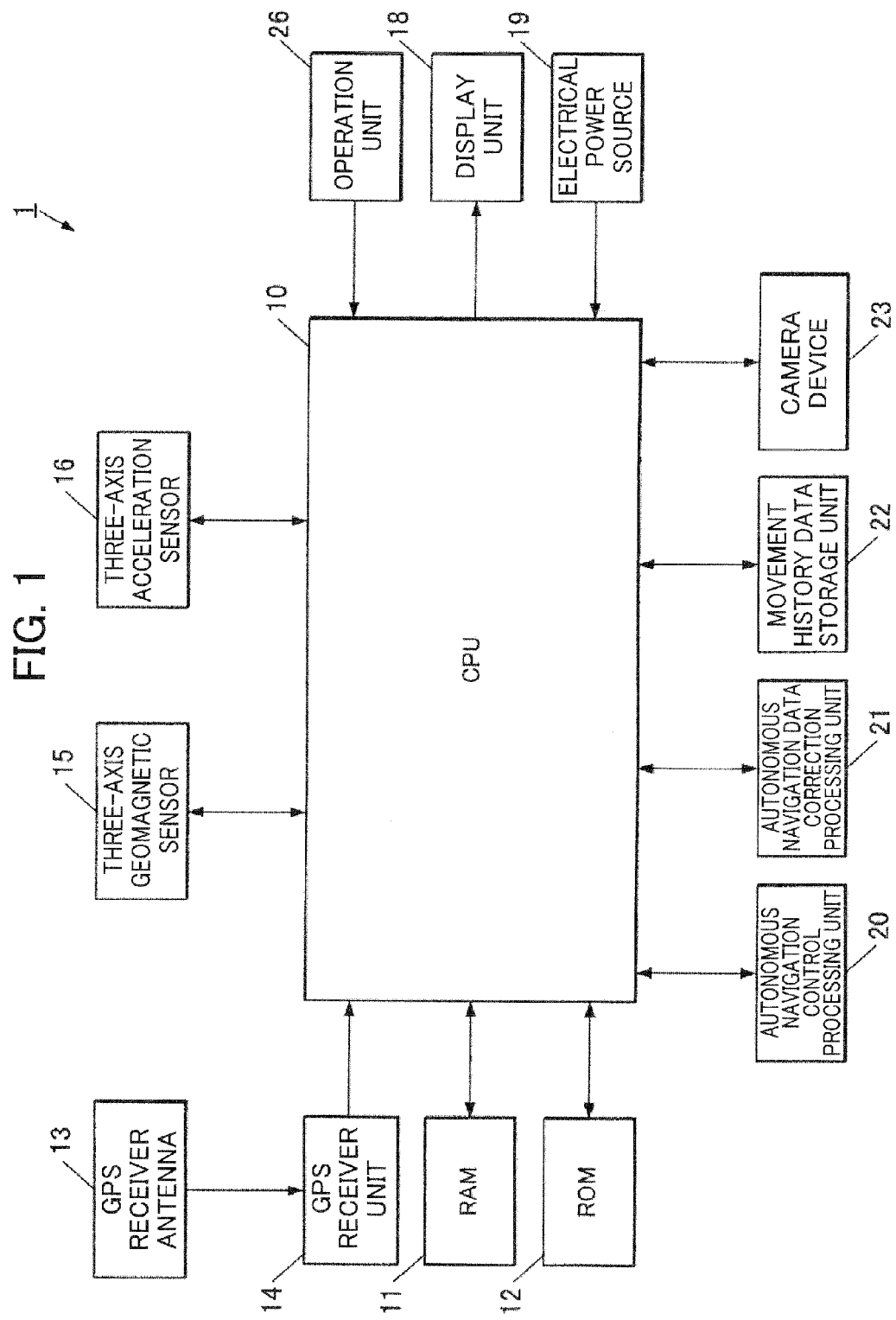
FIG. 1 is a block diagram showing the entirety of an image capturing device according to an embodiment of the present invention.

An image capturing device 1, which is an embodiment of the present invention, will be explained with reference to FIG. 1.

The image capturing device 1 of the present embodiment is a device that can store image data obtained from photographing in association with positional information of the photographing position, in a case of the photographing operation having been performed while moving.

The image capturing device 1 of the present embodiment includes a positioning device that performs positioning processing while moving and can record positional data of each spot on a travel route. Specifically, this image capturing device 1 includes a CPU (Central Processing Unit) 10 that performs overall control of the device, RAM (Random Access Memory) 11 that provides memory space for operations of the CPU 10, ROM (Read Only Memory) 12 in which control data and control program executed by the CPU 10 are stored, a GPS receiver antenna 13 and a GPS receiver unit 14 for receiving data transmitted from GPS (Global Positioning System) satellites, a three-axis geomagnetic sensor 15 and a three-axis acceleration sensor 16 that are sensors for autonomous navigation, a display unit 18 that performs various information display and image display, an electrical power source 19 that supplies operating voltage to each unit, an operation unit 26 that allows operation commands to be input from an outside entity, an autonomous navigation control processing unit 20 that performs positioning computing of autonomous navigation based on measurement data of the sensors (15, 16) for autonomous navigation, an autonomous navigation data correction processing unit 21 that performs correction computing of the positional data acquired from the autonomous navigation control processing unit 20, a movement history data storage unit 22 in which a series of positional data along a travel route is accumulated, a camera device 23 that performs photographing, and the like.

Based on a movement command from the CPU 10, the GPS receiver unit 14 performs demodulation processing of signals received via the GPS receiver antenna 13, and sends various transmitted data of GPS satellites to the CPU 10. The CPU 10 can acquire positional data representing the current position by performing predetermined positioning computing based on the transmitted data of GPS satellites.

The three-axis geomagnetic sensor 15 is a sensor that detects the direction of geomagnetism, and the three-axis acceleration sensor 16 is a sensor that detects acceleration in each of the three axis directions.

The autonomous navigation control processing unit 20 is a unit for assisting in computational processing of the CPU 10, and inputs measurement data of the three-axis geomagnetic sensor 15 and the three-axis acceleration sensor 16 via the CPU 10 in a predetermined sampling period and calculates the direction of movement and amount of movement of the image capturing device 1 from these measurement data. Furthermore, the autonomous navigation control processing unit 20 obtains positional data of a traveled spot and supplies it to the CPU 10 by cumulating vector data composed of the above-mentioned direction of movement and amount of movement thus calculated to positional data of a reference spot supplied from the CPU 10.

The autonomous navigation data correction processing unit 21 is a computational device for assisting in the computational processing of the CPU 10. This autonomous navigation data correction processing unit 21 performs correction computing for adjusting one set or a plurality of preliminary positional data calculated by the autonomous navigation control processing unit 20 and stored in the movement history data storage unit 22, to be authenticated positional data, based on positional data given by GPS positioning at a spot while moving or when movement ends. The contents of this correction computing will be described in detail later.

The movement history data storage unit 22 is constituted by RAM, nonvolatile memory, or the like, for example, and has movement history data such as that shown in FIG. 3 recorded therein, for example. The movement history data is data in which positional data acquired during device movement is sequentially entered.

The camera device 23 is a device that has an imaging element such as a CMOS (Complementary Metal Oxide Semiconductor) sensor or CCD (Charge-Coupled Device), a lens that allows for formation of an image of a subject, and the like, and records the image of the subject formed in the imaging element by converting into digital signals in accordance with a command of the CPU 10. A storage device (storage medium) of high capacity, for example, is provided to this camera device 23, and it is constituted such that image data acquired from photographing is saved in this storage device.

A photographing position determining program for executing photographing position determining processing by jointly using position measurement by way of an autonomous navigation function and position measurement using GPS, in order to acquire positional data of each spot on a travel route as well as to obtain positional data of a spot at which photographing was performed by way of the camera device 23, is stored in the ROM 12. This program can be not only stored in the ROM 12, but also can be stored in a portable storage medium such as an optical disk, a nonvolatile memory such as a flash memory, or the like, for example, that can be read by the CPU 10 through a data reading device. In addition, it is possible to apply a manner in which such a program is downloaded to the image capturing device 1 via a communication line with a carrier wave as a medium.

Next, photographing position determining processing that is executed in the image capturing device 1 constituted as described in the above will be explained with reference to FIG. 2. This photographing position determining processing is realized by reading out the photographing position determining program stored in the ROM 12 by way of the CPU 10, and executing this. In addition, this photographing position determining processing is executed when the electrical power source of the image capturing device 1 is switched ON, or when an operation input for activation is performed via the operation unit 26. It should be noted that determining a position based on the transmitted data of GPS satellites is called GPS positioning and measuring a position by way of an autonomous navigation function is called autonomous navigation positioning in the following explanation.

When photographing position determining processing is initiated, after a photo shoot has been performed by the user operating the camera device 23 (Step S101), the CPU 10 saves that image data thus photographed in a storage device included in the camera device 23 (Step S102).

Consequently, the CPU 10 initiates recording of an absolute position measurement by way of GPS positioning and a relative movement trajectory by way of autonomous navigation positioning (Step S103). More specifically, with this processing, the CPU 10 performs positioning computing by issuing a command to the GPS receiver unit 14 at each specified time period established in advance to receive data transmitted from the GPS satellites. In addition, simultaneously with execution of this positioning computing, the CPU 10 sends measurement data of the three-axis geomagnetic sensor 15 and measurement data of the three-axis acceleration sensor 16 to the autonomous navigation control processing unit 20 to generate relative position variation data, and adds this data to previous positional data to calculate current positional data. It should be noted that, when positional data by GPS positioning is not obtained due to data transmitted from the GPS satellites not being obtained or the like, only positional data by autonomous navigation positioning is acquired.

Next, the CPU 10 starts a position measurement timer for keeping the time for which measurement of the photographing position is performed (Step S104).

Thereafter, if positional data is obtained from GPS positioning, the CPU 10 saves this along with positional data obtained by autonomous navigation positioning from the photo shoot up to the present time as preliminary data in a preliminary data saving region of the movement history data storage unit 22 (Step S105).

In addition, the CPU 10 sets a match counter value and a determination value stored in the RAM 11 to 0 (Step S106).

Then, the CPU 10 determines whether the position measurement timer has timed-out (Step S107). When the CPU 10 has determined having timed-out (Step S107: Y), the CPU 10 executes the processing of Step S117.

On the other hand, when having timed-out is not determined in Step S107 (Step S107: N), the CPU 10 acquires positional data by GPS positioning and positional data by autonomous navigation positioning (Step S108), and calculates a movement vector based on positional information by GPS positioning, and a movement vector based on positional information by autonomous navigation positioning, respectively (Step S109). More specifically, the CPU 10 obtains a movement vector based on positional data by GPS positioning from calculating an amount of movement variation between the positional data by GPS positioning presently acquired and positional data by GPS positioning previously acquired In addition, the CPU 10 employs the vector data presently calculated by the autonomous navigation control processing unit 20 as a movement vector based on positional data by autonomous navigation positioning. It should be noted that, although it has been described in the present embodiment that a movement vector is obtained based on positional data by GPS positioning presently acquired and positional data by GPS positioning previously acquired, and the present vector data calculated by the autonomous navigation control processing unit 20 is set as a movement vector based on positional data by autonomous navigation positioning, movement vectors may be respectively obtained based on respective positional data of GPS positioning and autonomous navigation positioning acquired presently and the time before previously. In addition, the movement vectors may be respectively obtained based on respective positional data of GPS positioning acquired presently and any plurality of previous times and autonomous navigation positioning.

Next, the CPU 10 determines whether the movement vector based on positional data by autonomous navigation positioning agrees with the movement vector based on positional data by GPS positioning (Step S110). It should be noted that the CPU 10 may determine in step S110 whether the error in the movement vector is within a fixed error range.

If it is determined that the movement vectors agree (Step S110: Y), the CPU 10 increments the match counter value stored in the RAM 11 by 1 (Step S111) and then executes the processing of Step S113. On the other hand, when it is not determined that the movement vectors match (Step S110: N), after the CPU 10 has cleared the match counter value stored in the RAM 11 (Step S112) the processing of Step S107 is executed.

In Step S113, the CPU 10 determines whether the match counter value thus updated is greater than a determination value (Step S113). If it is not determined that the match counter value is greater than the determination value (Step S113: N), the CPU 10 executes the processing of Step S107.

On the other hand, if it is determined that the match counter value is greater than the determination value (Step S113: Y), the CPU 10 saves the positional data by GPS positioning presently acquired and positional data by autonomous navigation positioning by overwriting as preliminary data in the preliminary data saving region of the movement history data storage unit 22 (Step S114). Then, the CPU 10 sets the value indicated by the match counter stored in the RAM 11 to the determination value (Step S115).

Next, the CPU 10 determines whether the match counter value has reached a specified value (e.g., "5") established in advance (Step S116), and if it is determined that the match counter value has reached the specified value (Step S116: Y), the CPU 10 judges that the positional data by GPS positioning presently acquired is data having little error and executes the processing of Step S117, and if it is not determined that the match counter value has reached the specified value (Step S116: N), the CPU 10 executes the processing of Step S107.

In Step S117, the CPU 10 issues a command to the autonomous navigation data correction processing unit 21, and causes the positional data of the photographing position to be calculated based on the respective preliminary data of the positional data by GPS positioning stored in the preliminary data saving region of the movement history data storage unit 22 (i.e. positional data of the position determination spot) and positional data by autonomous navigation positioning (Step S117). Then, after the CPU 10 has recorded the positional data of the photographing position thus calculated in the image data saved in the storage device of the camera device 23 (Step S118), this processing ends.

Describing Step S117 in detail, the preliminary positional data by autonomous navigation positioning stored in the preliminary storage region of the movement history data storage unit 22 indicates an amount of position variation from a coordinate A of a photographing position (X:0, Y:0). In addition, the preliminary positional data by GPS positioning indicates the absolute position. Then, with the autonomous navigation data correction processing unit 21, when the positional data by GPS positioning stored in the preliminary saving region of the movement history data storage unit 22 is obtained, processing to correct the preliminary positional data acquired by autonomous navigation positioning of the photographing position is performed using the authenticated positional data. With this correction processing, a difference from the preliminary positional data obtained by way of autonomous navigation positioning to the authenticated positional data acquired by way of GPS positioning is calculated for a spot for which authenticated positional data has been received (position determination spot). Then, by adding this difference to the preliminary positional data acquired by autonomous navigation positioning of a photographing position, the preliminary positional data of the photographing position is corrected to positional data of the authenticated photographing position. It should be noted that, in addition to the photographing position, correction processing is also performed on positional data acquired by autonomous navigation positioning from the photographing position to the position determination spot in the present embodiment.

Herein, if the preliminary positional data by GPS positioning provided to the autonomous navigation data correction processing unit 21 and stored in the preliminary saving region of the movement history data storage unit 22 is data determined to have little error in Step S116, since it can be seen as being positional data having extremely high reliability, it becomes possible to obtain authenticated positional data of the photographing position having extremely high reliability.

In addition, in a case of the position measurement timer having timed out, at this time, since the preliminary positional data by GPS positioning for a moment at which the number of times the movement vector calculated based on positional data by autonomous navigation positioning consecutively matches the movement vector calculated based on positional data by GPS positioning is the most is used in the correction of the authenticated positional data of the photographing position, it becomes possible to curb electrical consumption and obtain authenticated positional data of the photographing position having high reliability.

In this way, in a case of the movement vector based on positional data by GPS positioning and the movement vector based on positional data by autonomous navigation positioning having matched between at least two spots, since the reliability of the positional data by GPS positioning can be assumed to be high, in the present embodiment, the reliability of the authenticated positional data of the photographing position can be raised by using the positional data by GPS positioning at this time when obtaining the authenticated positional data of the photographing position.

Furthermore, in the present embodiment, positional data by way of GPS positioning for a moment when matching of the movement vectors has been determined a predetermined number of times is used for obtaining the authenticated positional data of the photographing position. Accordingly, the reliability of this positional data by GPS positioning is further raised. As a result, it is possible to greatly raise the reliability of the authenticated positional data of the photographing position.

In addition, in a case of having kept the time for which measurement of photographing positions is performed and having timed out, the positional data by GPS positioning having the highest reliability at this time is used for obtaining authenticated positional data of the photographing position in the present embodiment. In general, the electrical consumption accompanying GPS positioning is high. Consequently, since the image capturing device and positioning device are devices that are generally carried by a user, a charge accumulator such as a battery is used as an electrical power source. As a result, even though positional data having extremely high reliability is not obtained, since positional data having a certain degree of reliability is obtained when a given time period has passed, the consumption of electrical power accompanying positioning is curbed by causing the positioning to end when a given time period has passed, and thus control to shorten the operating time of the image capturing device is achieved.

Operations from picture photographing being performed by way of the camera device 23 until the authenticated positional data of a photographing location is obtained for the image capturing device 1 constructed in the above way will be explained with reference to FIGS. 3 to 7.

FIG. 3A is a data chart illustrating movement history by autonomous navigation positioning acquired in the image capturing device 1, and FIG. 3B is a data chart illustrating movement history by GPS positioning acquired in the image capturing device 1. In addition, FIG. 3C shows movement history after having performed correction on the movement history data shown in FIG. 3A, based on positional data by GPS positioning acquired at position determination spots. It should be noted that, in the present embodiment, the positional data by autonomous navigation positioning at photographing positions may be stored in the movement history data storage unit 22 with positional data by GPS positioning and positional data by autonomous navigation positioning acquired at position determination spots, and positional data in the middle thereof may not be stored. It is possible to obtain authenticated positional data of photographing positions even if made in such a constitution.

It is constituted such that the index numbers "No." representing the acquisition order of the positional data, time data representing the time when the positional data was acquired, movement vectors indicating an amount of movement variation from positional data previously acquired until positional data presently acquired, and the like appended to a series of positional data are respectively recorded in the data charts shown in FIGS. 3A and 3B.

Figure 4:
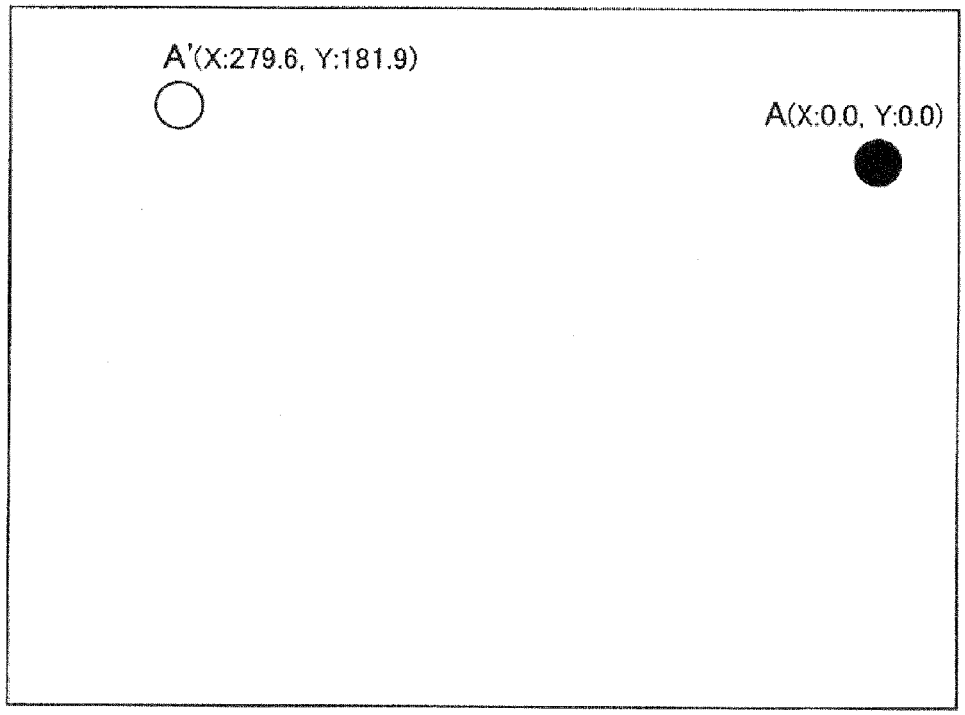
FIG. 4 is a graph illustrating a step of determining positional information of a photographing position based on positioning results of autonomous navigation positioning and GPS positioning.

First, when photographing is performed by way of the camera device 23, positional data "X: 0.0, Y: 0.0" of a photographing position A is acquired by autonomous navigation positioning, as shown in FIG. 4. In addition, "X: 279.6, Y: 181.9" is acquired as positional data by GPS positioning at this time. It should be noted that, in the figure, the position indicating this positional data is provisionally expressed as A'. These positional data are saved as preliminary data. It should be noted that, at this time, in a case of not having been able to acquire positional data by GPS positioning, the positional data by autonomous navigation positioning and positional data by GPS positioning when positional data had been acquired by GPS positioning are initially saved as preliminary data.

Figure 5:
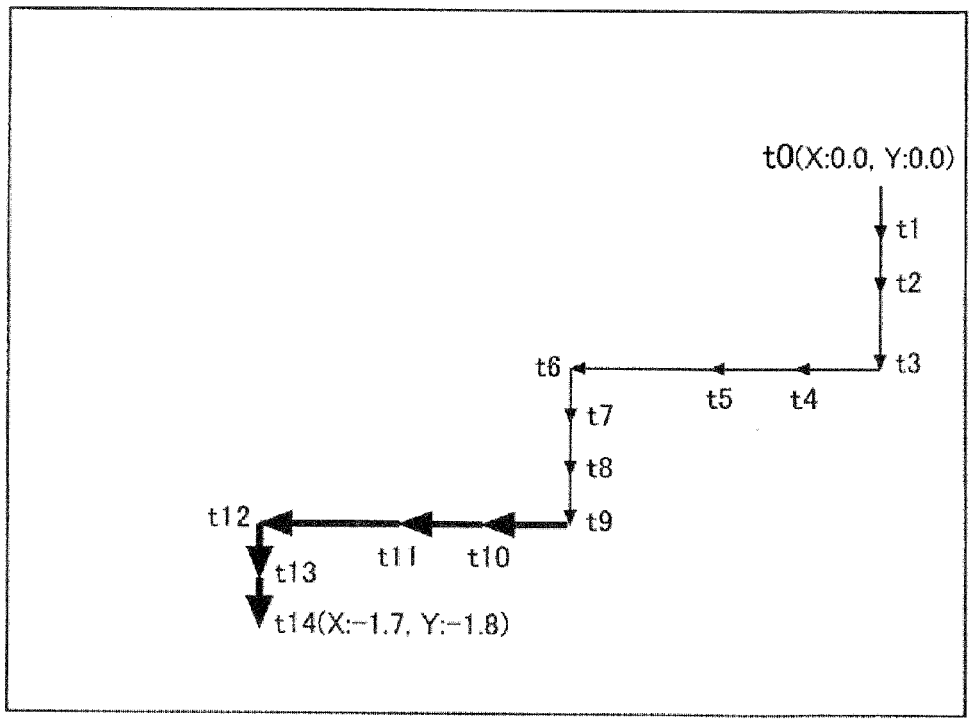
FIG. 5 is a graph illustrating a step of determining positional information of a photographing position based on positioning results of the autonomous navigation positioning and GPS positioning.
Figure 6:
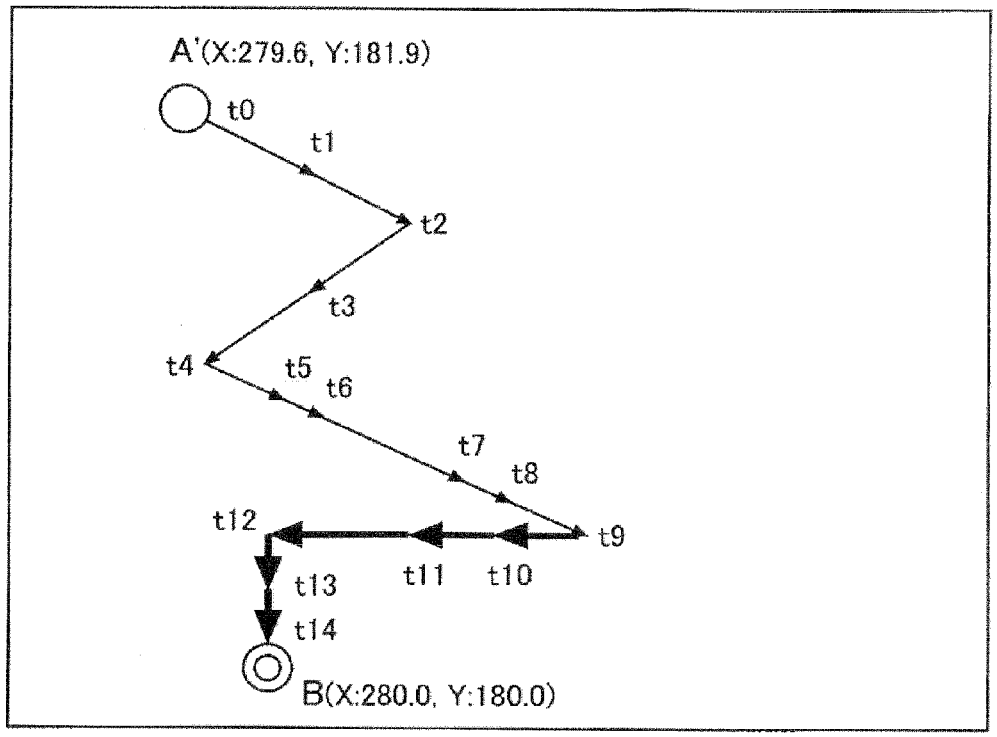
FIG. 6 is a graph illustrating a step of determining positional information of a photographing position based on positioning results of the autonomous navigation positioning and GPS positioning.

Then, positional data by autonomous navigation positioning and positional data by GPS positioning are each acquired at each specified time period (e.g., 1 second), and positional data of each spot on a travel route and movement vectors are respectively recorded. Movement trajectories by autonomous navigation positioning recorded in this way are shown in FIG. 5, and movement trajectories by GPS positioning are shown in FIG. 6.

Although autonomous navigation positioning and GPS positioning are continuously performed in the way described above, since transmitted data from the appropriate GPS satellites cannot be acquired immediately after positioning initiation, the positional data by GPS positioning has a large amount of error from the actual position until the time t8, and the movement vectors calculated based on positional data of GPS positioning differ greatly from the movement vectors calculated based on the positional data of autonomous navigation positioning, as shown in FIG. 3.

However, it becomes possible to acquire transmitted data from the appropriate GPS satellite with the GPS receiver unit 14 thereafter, and thus it becomes possible from the time t9 to acquire positional data having high reliability with little error from the actual positions.

Figure 2:
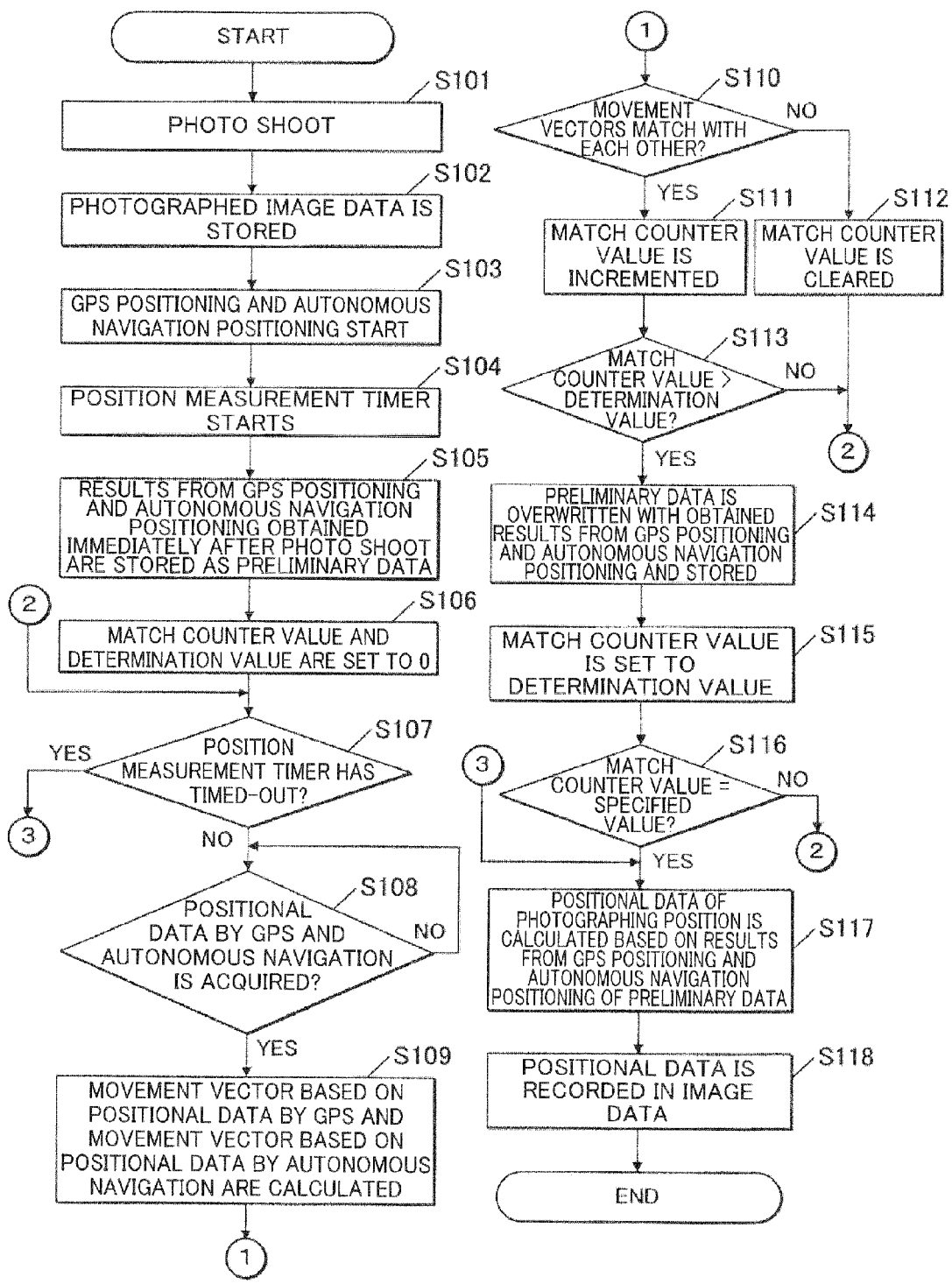
FIG. 2 is a flowchart showing a processing sequence of photographing position determining processing.

Then, at the time t10, the movement vector based on positional data by autonomous navigation positioning and the movement vector based on positional data by GPS positioning match (or come to be within a fixed range of error), and incrementing of the match counter value is begun (FIG. 2, Step S111).

Afterward, at the time t14, the number of times the movement vector based on positional data by autonomous navigation positioning and movement vector based on positional data by GPS positioning match each other reaches a specified value, and the positional data by GPS positioning "X: 280.0, Y: 180.0" at this time is adopted as the positional data of the position determination spot. In FIG. 6, the position at this time is indicated by B.

When positional data by GPS positioning of a position determination spot B is acquired in this way, the following correction is performed on the positional data of the data chart illustrating the movement history by way of autonomous navigation positioning.

Specifically, first, by causing to move from the positional data "X: −1.7, Y: −1.8" at the time t14 obtained by autonomous navigation positioning, until the positional data at the time t14 acquired by GPS positioning, i.e. until the positional data of the position determination spot B, the difference in positional data is calculated from the amount of movement variation therebetween. In this example, the differences are "+281.7" in the X direction and "+181.8" in the Y direction.

Figure 7:
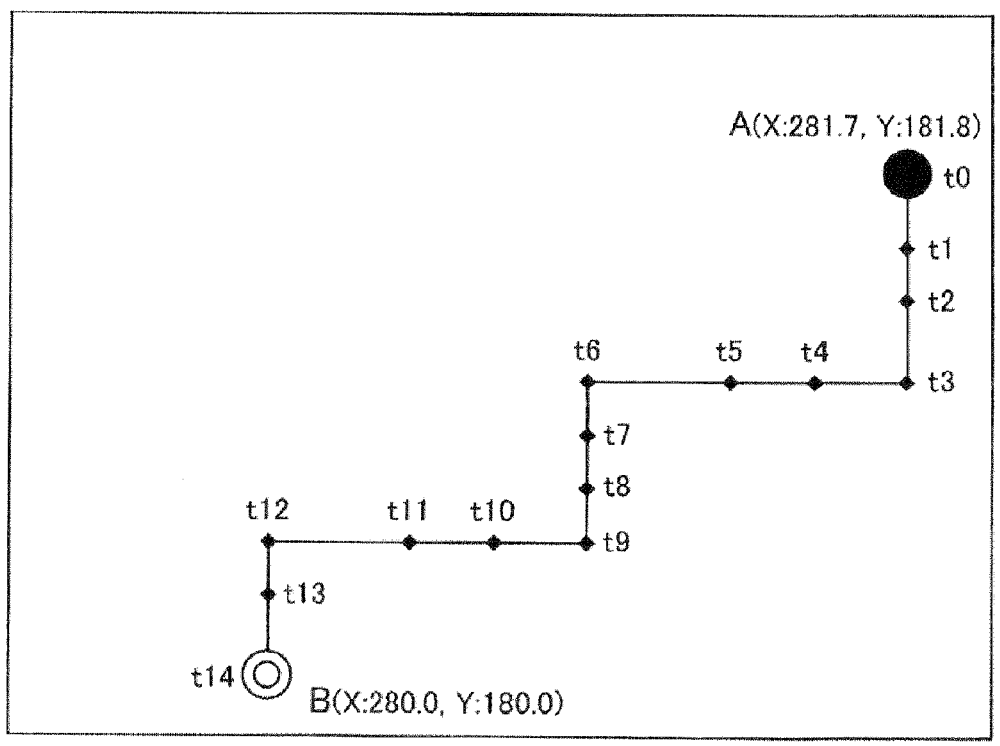
FIG. 7 is a graph illustrating a step of determining positional information of a photographing position based on positioning results of the autonomous navigation positioning and GPS positioning.

When the differences are calculated in this way, the differences thus calculated are added to positional data of the data chart illustrating movement history by autonomous navigation positioning. When this is done, authenticated positional data of each spot is obtained as shown in FIG. 3C. The positions shown at this time are as illustrated in FIG. 7. As a result thereof, the authenticated positional data of the photographing position A is "X: 281.7, Y: 181.8", and this positional data is saved in an image file at the time of photographing in a storage device of the camera device 23. This image file is constituted in accordance with Exif format (Exchange Image File format) for example, and positional data is written in a latitude/longitude region of a tag indicated by a pointer "GPSInfoIFDPointer" to GPS information. It should be noted that it may be constituted so as to write information of the altitude, GPS time, etc. in this image file. In addition, this image file is not limited to the file format adopted in the present embodiment, and may be constituted in accordance with another file format.

As has been explained above, according to the embodiment of the present invention, the three-axis geomagnetic sensor 15, three-axis acceleration sensor 16, and autonomous navigation control processing unit 20 perform measurement of relative position variation (autonomous navigation positioning). Moreover, the CPU 10 and GPS receiver unit 14 measure positional data (GPS positioning). In addition, the CPU 10 begins continuous measurement by autonomous navigation positioning and measurement by GPS positioning at the photographing position at each predetermined timing. Then, in a case in which the difference between a movement vector calculated based on positional data of at least two spots obtained by GPS positioning and a movement vector of at least two spots each obtained by autonomous navigation positioning concurrently with positional data obtained by GPS positioning is within a predetermined range, the CPU 10 determines a position determination spot based on positional data of any of the at least two spots. Furthermore, the CPU 10 obtains positional data of a photographing position based on positional data of a position determination spot and positional data that has been continuously measured by autonomous navigation positioning. As a result thereof, the reliability of authenticated positional data of the photographing position can be raised, and thus an improvement can be achieved in the accuracy of positional information for an unstable state of positioning by GPS positioning.

In addition, according to the embodiment of the present invention, the autonomous navigation control processing unit 20 calculates positional data of each spot on a travel route by cumulating the vector data measured by the three-axis geomagnetic sensor 15, the three-axis acceleration sensor 16, and the autonomous navigation control processing unit 20 with the positional data of photographing positions. Then, the CPU 10 provides preliminary positional data of photographing position to the autonomous navigation control processing unit 20, and causes positional data of each spot on the travel route to be calculated by the autonomous navigation control processing unit 20. Next, when the position determination spot has been determined, the CPU 10 obtains positional data of the photographing position by adding the difference between the positional data of the position determination spot calculated based on preliminary positional data of the photographing position by the autonomous navigation control processing unit 20 and the positional data of the position determination spot measured by GPS positioning to the preliminary positional data of the photographing position. As a result thereof, the storage space required in this correction processing can be reduced, and the load of computational processing related to this processing can also be reduced.

In addition, according to the embodiment of the present invention, the CPU 10 and the GPS receiver unit 14 perform GPS positioning at each predetermined specified time period. Then, the three-axis geomagnetic sensor 15, the three-axis acceleration sensor 16, and the autonomous navigation control processing unit 20 perform autonomous navigation positioning concurrently with GPS positioning at this each predetermined specified timing. Then, in a case of the difference between a movement vector calculated based on positional data of at least two spots obtained by GPS positioning and a movement vector of at least two spots each obtained by autonomous navigation positioning concurrently with the positional data obtained by GPS positioning being consecutively determined to be within a predetermined range a predetermined number of times, the CPU 10 obtains positional data of the photographing position. As a result thereof, since the reliability of positional data by GPS positioning at position determination spots is further raised, it is possible to greatly raise the reliability of authenticated positional data at photographing positions.

In addition, according to the embodiment of the present invention, the three-axis acceleration sensor 16 that outputs information that can specify acceleration, and the three-axis geomagnetic sensor 15 that outputs information that can specify direction are provided. Then, the autonomous navigation control processing unit 20 performs autonomous navigation positioning based on the information respectively output from the three-axis acceleration sensor 16 and the three-axis geomagnetic sensor 15. As a result thereof, it is possible to measure accurate relative position variation.

It should be noted that, although it has been described in the embodiment of the present invention that a positioning device according to the embodiment of the present invention is provided to an image capturing device, the positioning device according to the embodiment of the present invention may be applied to a general navigation device of portable type or a mounted positioning device in a moving body, and may be constituted so as to obtain positional data of specified positions.

In addition, although it has been described in the embodiment of the present invention that computing of autonomous navigation positioning and correction processing of positional data is executed by the autonomous navigation control processing unit 20 and the autonomous navigation data correction processing unit 21, it may be constituted in such a manner that these computations are carried out by software processing of the CPU 10.

In addition, although it has been described in the embodiment of the present invention that GPS is employed as a positioning unit, various alternative constitutions can be adopted such as a constitution performing positioning by communication with base stations for cellular telephones and a constitution that defines a current position by inputting positional information received from an outside entity using Radio Frequency Identification) RFID, or the like.

Moreover, although it has been described in the embodiment of the present invention that a three-axis geomagnetic sensor and a three-axis acceleration sensor are exemplified as a movement measurement unit for performing measurement of relative position variation, a two-axis direction sensor and a two-axis acceleration sensor can be used so long as the orientation of the device to the earth is fixed. Additionally, a gyroscope or the like can also be adopted in order to obtain direction. Furthermore, it may be constituted so as to obtain the rate of movement using a wheel speed sensor. In addition, although the positional data obtained is defined as two-dimensional positional data in the embodiment of the present invention, it may be constituted so as to contain positional data of the height direction.

Moreover, although it has been described in the embodiment of the present invention that positional data (positional data of at an end point of a movement vector) obtained by GPS positioning of a moment when the difference between a movement vector calculated based on positional data of at least two spots obtained by GPS positioning and a movement vector of at least two spots each obtained by autonomous navigation positioning concurrently with the positional data obtained by GPS positioning is consecutively determined to be within a predetermined range a predetermined number of times is defined as the positional data of a position determination spot, it may be constituted in such manner that any position on a movement vector for which the difference between movement vectors is consecutively determined to be within a predetermined range is determined as the position determination spot, or may be constituted in a such a manner that a starting point, or an intermediate point between the starting point and end point of a movement vector is determined as the position determination spot.

Furthermore, although it has been described in the embodiment of the present invention that positional data of the photographing position is determined when the difference between a movement vector calculated based on positional data of at least two spots obtained by GPS positioning and a movement vector of at least two spots each obtained by autonomous navigation positioning concurrently with the positional data obtained by GPS positioning is consecutively determined to be within a predetermined range five times, the determination number of times is not limited to five times, and may be any alternative number of times. Additionally, it may be constituted in such a manner that positional data of the photographing position is determined when the difference between movement vectors is determined to be within a predetermined range only one time.

Moreover, although it has been described in the embodiment of the present invention that a position determination spot is obtained when the difference between movement vectors is determined to be within a predetermined range continuously for a predetermined time period by determining a value of a match counter, it may be constituted in such a manner that amounts of movement are cumulated, and a position determination spot is obtained when a state of matching of movement trajectories or the error being within a predetermined range continues for at least a predetermined distance. If constituted in this way, determination can be performed taking into consideration a case in which the amount of movement is small or there is no movement, and thus an improvement is achieved in the accuracy of positional data by GPS positioning for position determination spots.

In addition, although while it has been described in the embodiment of the present invention that, in a case of the match counter not having reached a specified value even by performing comparison of movement vectors for a fixed time period, the positional data of a photographing position is obtained with a spot when the match counter becomes a maximum during the measurement thus far as the position determination spot, the measurement may continue until the match counter reaches a specified value.

Figure 8B:
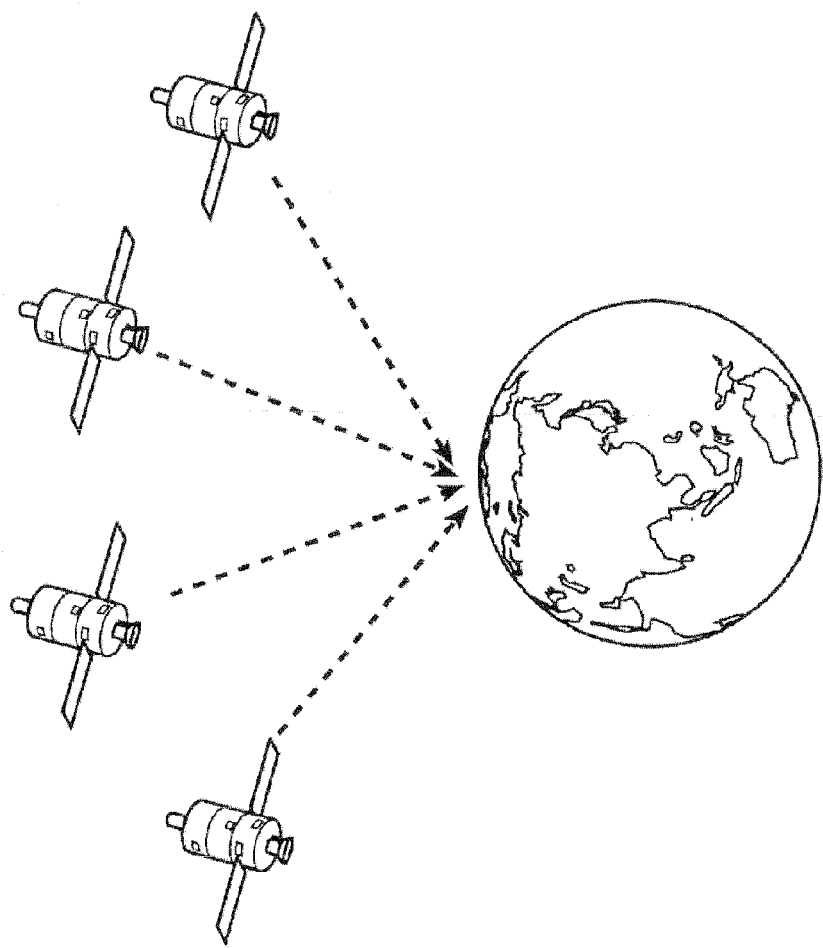
FIG. 8 is a view illustrating relationships between a DOP value and arrangements of GPS satellites.
Figure 8A:
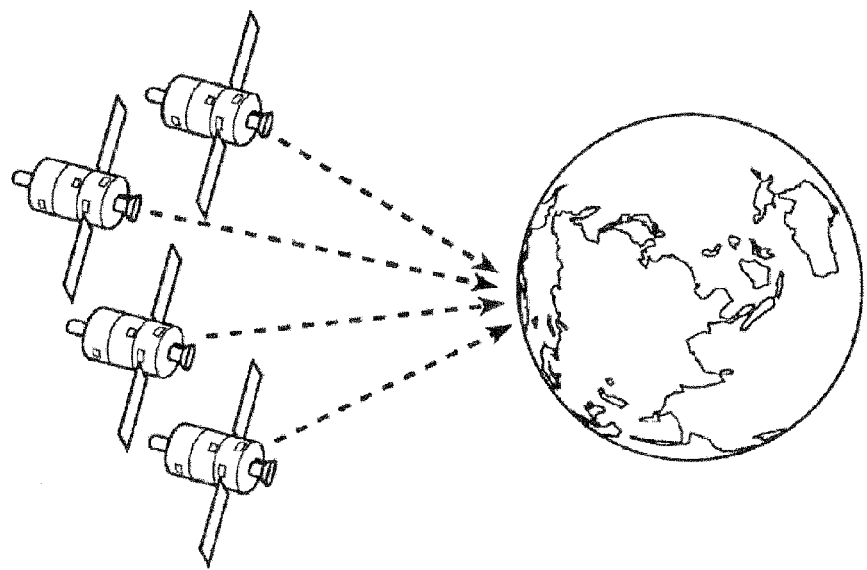

Furthermore, when accuracy determination according to a Dilution of Precision (DOP) value is performed while picture photographing is performed, and it is determined that this DOP value is no more than a predetermined threshold value (e.g., "3"), positioning for calculating the positional data of the photographing position may not be performed, and the positional data by GPS positioning acquired when photographing may be simply attached to the image file and thus saved without alteration. Herein, GPS positioning is affected in positioning accuracy by the arrangement of GPS satellites from which transmitted data is acquired. The DOP value is a numerical value indicating a degree of this positioning accuracy, and is calculated based on the arrangement of GPS satellites from which transmitted data is acquired. Consequently, when this value is smaller, it has been shown that the satellites are arranged to be widely scattered, and it has been recognized that the positioning accuracy is high. For example, with an arrangement such as that shown in FIG. 8A, it is recognized that the DOP value is large, and the positioning accuracy is low, and with an arrangement such as that shown in FIG. 8B, it is recognized that the DOP value is small and the position accuracy is high. If constituted in this way, it is possible to curb consumption of electrical power as much as possible. In particular, the present invention is effective in a hot start state of being activated in a state in which predetermined information relating to GPS satellites (navigation messages such as almanac data and ephemeris data) is stored.

What is claimed is:

1. A positioning device comprising:
a movement measuring unit that measures relative position variation;
a positioning unit that is capable of measuring positional information;
a control unit that performs control to:
cause the movement measuring unit to initiate continuous measurement of position variation and cause the positioning unit to initiate measurement of positional information at each predetermined timing for at least a specified position; and
in a case in which a difference between an amount of position variation calculated based on positional information of at least two positions obtained by the positioning unit and an amount of relative position variation of at least two spots each obtained by the movement measuring unit concurrently with the positional information obtained by the positioning unit is within a predetermined range, determine a position determination spot based on positional information of any of the at least two positions, and obtain positional information of the specified position based on positional information of the position determination spot and information of position variation that has been continuously measured by the movement measuring unit; and
a position calculating unit that calculates positional information of each position on a travel route by cumulating information of position variation measured by the movement measuring unit with the positional information of the specified position,
wherein the control unit provides preliminary reference positional information as positional information of the specified position to the position calculating unit, calculates positional information of each position on a travel route by the position calculating unit, and when the position determination spot is determined, obtains the positional information of the specified position by adding a difference between positional information of the position determination spot calculated based on the preliminary reference positional information calculated by the position calculating unit and positional information of the position determination spot measured by the positioning unit to the preliminary reference positional information.

2. A positioning device comprising:
a movement measuring unit that measures relative position variation;
a positioning unit that is capable of measuring positional information; and
a control unit that performs control to:
cause the movement measuring unit to initiate continuous measurement of position variation and cause the positioning unit to initiate measurement of positional information at each predetermined timing for at least a specified position; and
in a case in which a difference between an amount of position variation calculated based on positional information of at least two positions obtained by the positioning unit and an amount of relative position variation of at least two spots each obtained by the movement measuring unit concurrently with the positional information obtained by the positioning unit is within a predetermined range, determine a position determination spot based on positional information of any of the at least two positions, and obtain positional information of the specified position based on positional information of the position determination spot and information of position variation that has been continuously measured by the movement measuring unit,
wherein:
the positioning unit measures positional information at each predetermined time period,
the movement measuring unit performs measurement of position variation at each predetermined time period concurrently with the measuring by the positioning unit, and
the control unit obtains the positional information of the specified position, in a case in which a difference between an amount of position variation calculated based on positional information of at least two positions obtained by the positioning unit and an amount of relative position variation of at least two spots each obtained by the movement measuring unit concurrently with the positional information obtained by the positioning unit is determined to be consecutively within a predetermined range a predetermined number of times.

3. The positioning device according to claim 1, wherein the movement measuring unit includes an acceleration sensor that outputs acceleration-identifiable information and a direction sensor that outputs direction-identifiable information, and performs measurement of relative position variation based on information output from the acceleration sensor and the direction sensor, respectively.

4. The positioning device according to claim 1, wherein the position variation is a variation distance and a variation direction.

5. A positioning method for obtaining positional information of a specified position using a movement measuring unit that measures relative position variation and a positioning unit that is capable of measuring positional information, the method comprising:

a controlling step of performing control to:
- cause the movement measuring unit to initiate continuous measurement of position variation and cause the positioning unit to initiate measurement of positional information at each predetermined timing for at least a specified position; and
- in a case in which a difference between an amount of position variation calculated based on positional information of at least two positions obtained by the positioning unit and an amount of relative position variation of at least two spots each obtained by the movement measuring unit concurrently with the positional information obtained by the positioning unit is within a predetermined range, determine a position determination spot based on positional information of any of the at least two positions, and obtain positional information of the specified position based on positional information of the position determination spot and information of position variation that has been continuously measured by the movement measuring unit; and a position calculating step of calculating positional information of each position on a travel route by cumulating information of position variation measured by the movement measuring unit with the positional information of the specified position, wherein in the controlling step, preliminary reference positional information is provided to the position calculating step, positional information of each position on a travel route is calculated in the position calculating step, and when the position determination spot is determined, the positional information of the specified position is obtained by adding a difference between positional information of the position determination spot calculated based on the preliminary reference positional information calculated in the position calculating step and positional information of the position determination spot measured by the positioning unit to the preliminary reference positional information.

6. A positioning method for obtaining positional information of a specified position using a movement measuring unit that measures relative position variation and a positioning unit that is capable of measuring positional information, the method comprising:

a controlling step of performing control to:
- cause the movement measuring unit to initiate continuous measurement of position variation and cause the positioning unit to initiate measurement of positional information at each predetermined timing for at least a specified position; and
- in a case in which a difference between an amount of position variation calculated based on positional information of at least two positions obtained by the positioning unit and an amount of relative position variation of at least two spots each obtained by the movement measuring unit concurrently with the positional information obtained by the positioning unit is within a predetermined range, determine a position determination spot based on positional information of any of the at least two positions, and obtain positional information of the specified position based on positional information of the position determination spot and information of position variation that has been continuously measured by the movement measuring unit, wherein:
- the positioning unit measures positional information at each predetermined time period,
- the movement measuring unit performs measurement of position variation at each predetermined time period concurrently with the measuring by the positioning unit, and
- in the controlling step, the positional information of the specified position is obtained in a case in which a difference between an amount of position variation calculated based on positional information of at least two positions obtained by the positioning unit and an amount of relative position variation of at least two spots each obtained by the movement measuring unit concurrently with the positional information obtained by the positioning unit is determined to be consecutively within a predetermined range a predetermined number of times.

7. A non-transitory computer readable storage medium having a program stored thereon that is executable by a computer for obtaining positional information of a specified position based on input measurement results from a movement measuring unit that measures relative position variation and positioning unit that is capable of measuring positional information, respectively, to implement functions comprising:

a control function of:
- causing the movement measuring unit to initiate continuous measurement of position variation and causing the positioning unit to initiate measurement of positional information at each predetermined timing for at least a specified position; and
- in a case in which a difference between an amount of position variation calculated based on positional information of at least two positions obtained by the positioning unit and an amount of relative position variation of at least two spots each obtained by the movement measuring unit concurrently with the positional information obtained by the positioning unit is within a predetermined range, determining a position determination spot based on positional information of any of the at least two positions, and calculating positional information of the specified position based on positional information of the position determination spot and information of position variation that has been continuously measured by the movement measuring unit; and a position calculating function of calculating positional information of each position on a travel route by cumulating information of position variation measured by the movement measuring unit with the positional information of the specified position, wherein the control function provides preliminary reference positional information to the position calculating function, calculates positional information of each position on a travel route by the position calculating function, and when the position determination spot is determined, obtains the positional information of the specified position by adding a difference between positional information of the position determination spot calculated based on the preliminary reference positional information calculated by the position calculating function and positional information of the position determination spot measured by the positioning unit to the preliminary reference positional information.

8. A non-transitory computer readable storage medium having a program stored thereon that is executable by a computer for obtaining positional information of a specified position based on input measurement results from a movement measuring unit that measures relative position variation and positioning unit that is capable of measuring positional information, respectively, to implement functions comprising:

a control function of:

causing the movement measuring unit to initiate continuous measurement of position variation and causing the positioning unit to initiate measurement of positional information at each predetermined timing for at least a specified position; and in a case in which a difference between an amount of position variation calculated based on positional information of at least two positions obtained by the positioning unit and an amount of relative position variation of at least two spots each obtained by the movement measuring unit concurrently with the positional information obtained by the positioning unit is within a predetermined range, determining a position determination spot based on positional information of any of the at least two positions, and calculating positional information of the specified position based on positional information of the position determination spot and information of position variation that has been continuously measured by the movement measuring unit, wherein:

the positioning unit measures positional information at each predetermined time period, the movement measuring unit performs measurement of position variation at each predetermined time period concurrently with the measuring by positioning unit, and the control function obtains the positional information of the specified position, in a case in which a difference between an amount of position variation calculated based on positional information of at least two positions obtained by the positioning unit and an amount of relative position variation of at least two spots each obtained by the movement measuring unit concurrently with the positional information obtained by the positioning unit is determined to be consecutively within a predetermined range a predetermined number of times.

9. The positioning device according to claim 2, wherein the movement measuring unit includes an acceleration sensor that outputs acceleration-identifiable information and a direction sensor that outputs direction-identifiable information, and performs measurement of relative position variation based on information output from the acceleration sensor and the direction sensor, respectively.

10. The positioning device according to claim 2, wherein the position variation is a variation distance and a variation direction.

* * * * *